United States Patent [19]

Gunter et al.

[11] 4,296,469
[45] Oct. 20, 1981

[54] EXECUTION UNIT FOR DATA PROCESSOR USING SEGMENTED BUS STRUCTURE

[75] Inventors: Thomas G. Gunter; Harry L. Tredennick, both of Austin; Doyle V. McAlister, Pflugerville, all of Tex.

[73] Assignee: Motorola, Inc., Schaumburg, Ill.

[21] Appl. No.: 961,798

[22] Filed: Nov. 17, 1978

[51] Int. Cl.³ .............................................. G06F 11/00
[52] U.S. Cl. .................................................... 364/200
[58] Field of Search ... 364/200 MS File, 900 MS File; 340/147 LP; 179/15 AL

[56] References Cited

U.S. PATENT DOCUMENTS

| 3,242,467 | 3/1966 | Lamy | 364/200 |
|---|---|---|---|
| 3,308,436 | 3/1967 | Borck, Jr. et al. | 364/200 |
| 3,631,401 | 12/1971 | Dinman | 364/200 |
| 3,651,473 | 3/1972 | Faber | 364/200 |
| 3,681,761 | 8/1972 | Schuenemann et al. | 364/200 |
| 3,810,114 | 5/1974 | Yamada et al. | 364/200 |
| 3,812,469 | 5/1974 | Hauck et al. | 364/200 |
| 3,947,818 | 3/1976 | Kobayashi et al. | 340/147 LP |
| 3,984,819 | 10/1976 | Anderson | 364/200 |
| 4,004,281 | 1/1977 | Bennett et al. | 364/200 |
| 4,015,246 | 3/1977 | Hopkins, Jr. et al. | 364/200 |
| 4,047,162 | 9/1977 | Dorey et al. | 364/200 |
| 4,065,809 | 12/1977 | Matsumoto | 364/200 |
| 4,096,571 | 6/1978 | Vander Mey | 364/200 |
| 4,149,242 | 4/1979 | Pirz | 364/200 |

Primary Examiner—Harvey E. Sprinborn
Attorney, Agent, or Firm—Anthony J. Sarli, Jr.; Vincent B. Ingrassia; Jeffrey Van Myers

[57]      ABSTRACT

A data processor having an execution unit employs a segmented bus structure and a dual port register cell in order to increase circuit density and in order to allow address and data computations to occur simultaneously. The circuit is designed to interface with an external 16-bit bidirectional data bus and an external address bus having as many as 32 address bits. Serial bus switches on each of two parallel buses allow concatenation with a second pair of buses. Each bus, while 16 bits wide, actually utilizes two conductors per bit to carry data and the complement thereof.

6 Claims, 11 Drawing Figures

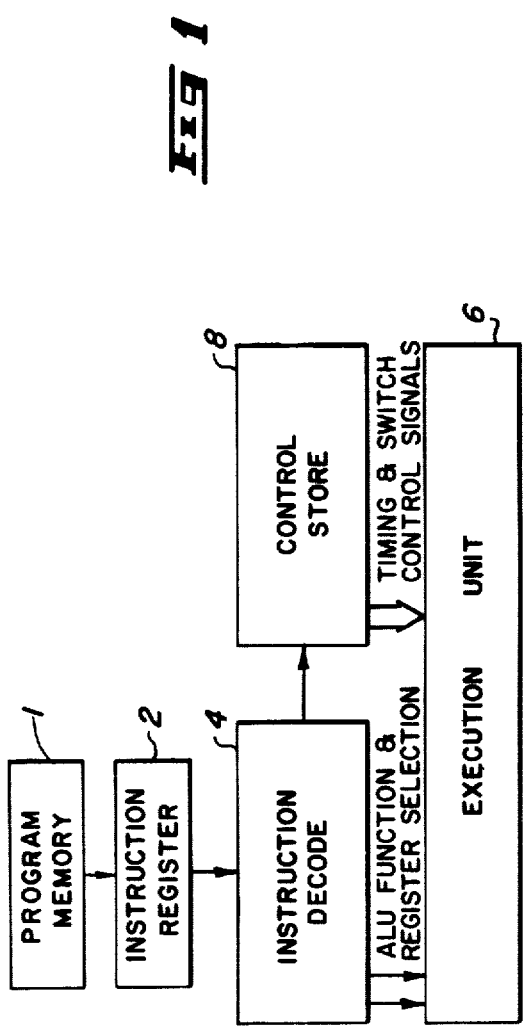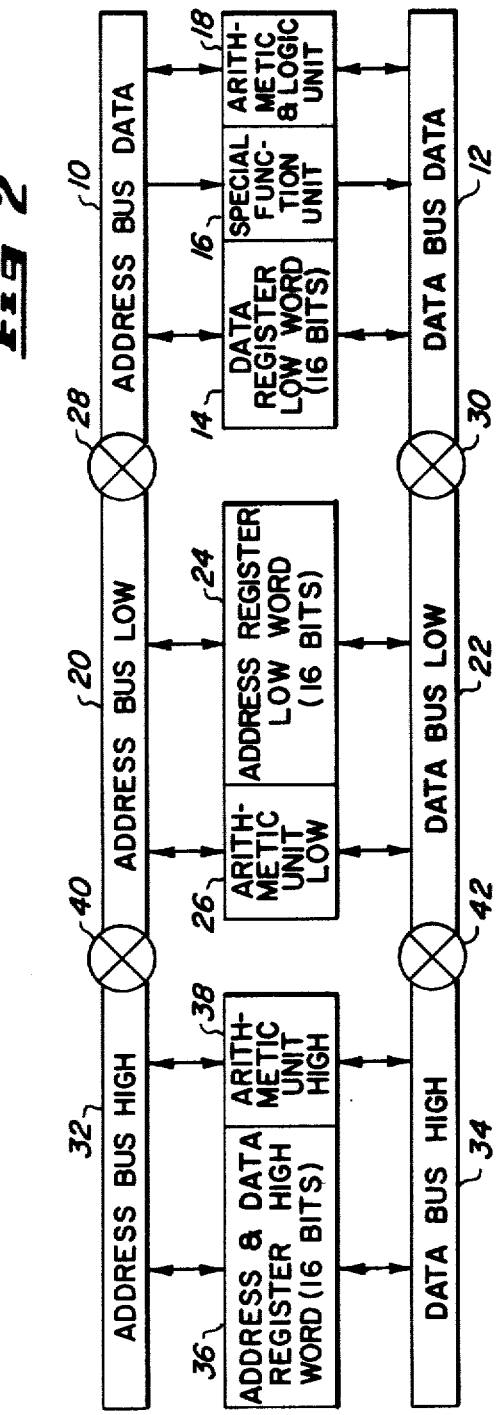

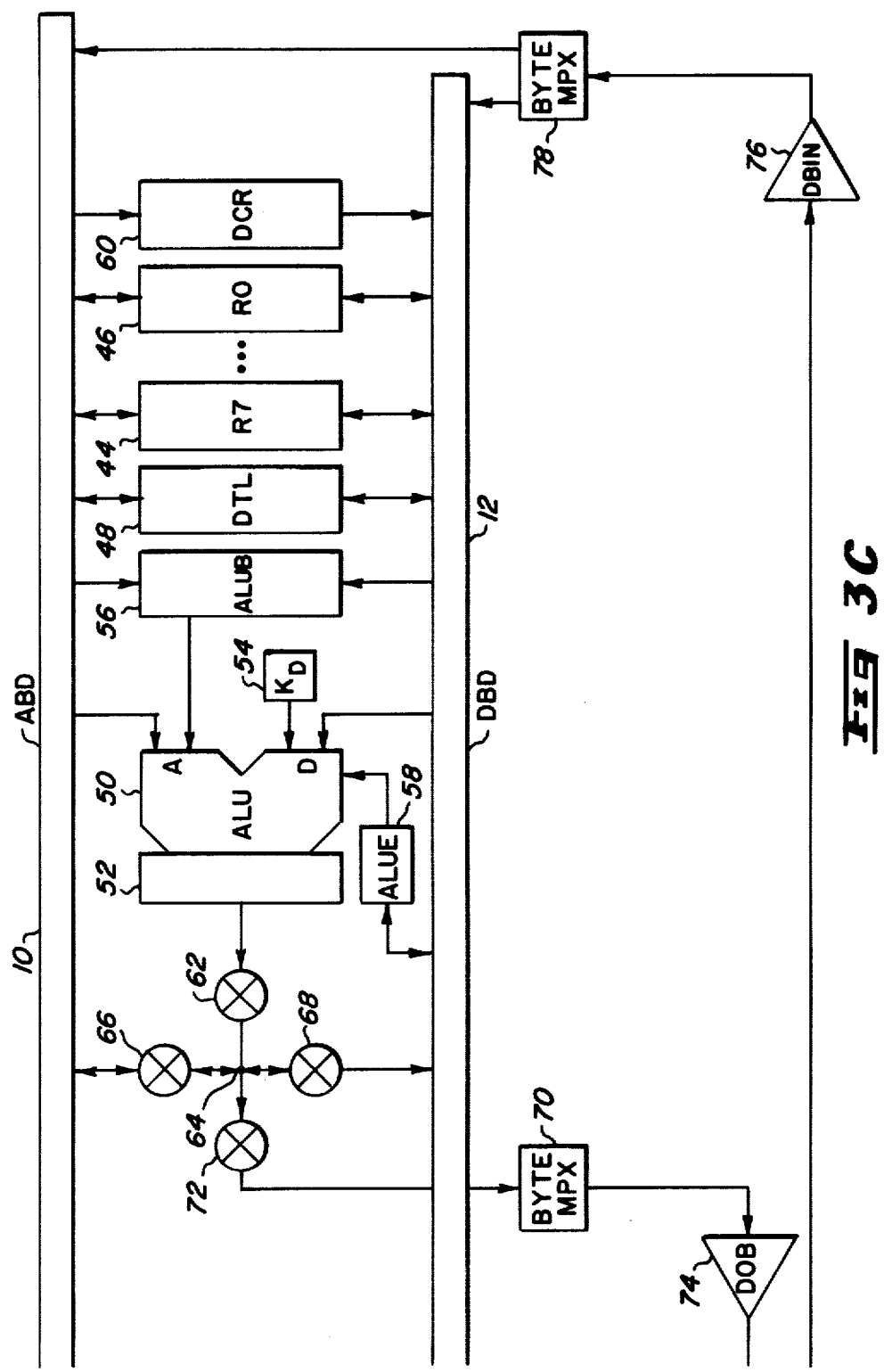

EXECUTION UNIT FOR DATA PROCESSOR USING SEGMENTED BUS STRUCTURE

CROSS-REFERENCE TO RELATED APPLICATIONS

1. "Multi-port RAM Structure For Data Processor Registers", invented by McAlister et al, bearing Ser. No. 961,797, filed on even date herewith, and assigned to the assignee of the present invention.

2. "Microprogrammed Control Apparatus For Data Processor Having a Two-Level Control Store", invented by Tredennick et al, bearing Ser. No. 961,796, filed on event date herewith, and assigned to the assignee of the present invention.

TECHNICAL FIELD

This invention relates generally to data processors and more particularly to a bus structure employed to implement the execution unit of a data processor.

BACKGROUND ART

The field of single-chip, large scale integration (LSI) microprocessors is advancing at an incredible rate. Progress in the underlying semiconductor technology, MOS, is driving the advance. Every two years, circuit densities are improving by a factor of 2, circuit speeds are increasing by a factor of 2, and at the same time speed-power products are decreasing by a factor of 4. Finally, yield enhancement techniques are driving down production costs and hence product prices, thereby increasing demand and opening up new applications and markets.

One effect of this progress in semiconductor technology is advancement in LSI microprocessors. The latest generation, currently being introduced by several companies, is an order of magnitude more powerful than the previous generation, the 8-bit microprocessors of three or four years ago. The new microprocessors have 16-bit data paths and arithmetic capability. They directly address multiple-megabyte memories. In terms of functional capability and speed, they will outperform all but the high end models of current 16-bit minicomputers.

A particular data processor, which incorporates the present invention, supports an instruction set which consists of general single and dual operand instructions involving byte (8 bits), word (16 bits) or double word operands. Operations are generally memory-to-register, register-to-memory, or register-to-register. In addition to standard instructions such as add, compare, and shift, this particular data processor is designed to support such instructions as load and store multiple registers, multiply and divide, and various forms of bit manipulation. The data processor provides eight 32-bit address manipulation registers and eight 32-bit data manipulation registers. Address registers allow 16-bit and 32-bit operations, and data registers allow 8-, 16-, and 32-bit operations. All address and data registers are accessible to the programmer. In addition, there is a program counter with limited user accessibility, and there are several registers not available to the user which are used for temporary storage during instruction execution.

In many prior art data processors, one or more digital buses are used to interconnect a plurality of address and data registers to an arithmetic unit within the execution unit of the data processor. The digital buses are also generally used to interconnect the execution unit to the input/output terminals of the data processor for transmitting an address and for transmitting and receiving instructions and data. An example of a data processor using such a bus structure is the MC6800 integrated circuit microprocessor supplied by Motorola, Inc., which is described in U.S. Pat. No. 4,004,281, "Microprocessor Chip Register Bus Structure", invented by Bennett et al and assigned to the assignee of the present invention.

One technique for improving the speed and efficiency of a data processor is to provide for parallel operations. For example, a data computation might be performed according to a current instruction while an address computation might be simultaneously performed for computing a memory address where the next instruction will be found. The bus structure disclosed by U.S. Pat. No. 4,004,281 is not ideally suited for such parallel operations. One approach to allow for more parallel operations is simply to add another digital bus in parallel with existing digital buses for allowing an additional transfer to occur without interfering with the transfers already taking place on the existing digital buses. Such an approach is disclosed in co-pending application "Microprocessor Having Plural Internal Data Buses" invented by Daniels et al, bearing Ser. No. 939,741, and assigned to the assignee of the present invention. However, the addition of one or more digital buses increases the required chip area for implementing the data processor. Also, additional coupling MOSFET devices are required in order to enable or disable the input and output of each register and arithmetic unit to the additional digital buses, and additional control signals must be decoded by the data processor control circuitry for controlling the added coupling MOSFET devices.

It will be noted that many address computations will require an arithmetic unit capable of more than mere increment and decrement functions. Indexed and self-relative addressing modes require that an offset be added to or subtracted from an index register or program counter, respectively. Thus a bus structure which allows for parallel address and data computations must allow for individual arithmetic units for address and data computations.

It should be appreciated by those skilled in the art that a bus structure which allows for a highly dense data processor execution unit and which is adapted to allow for parallel operations within the execution unit is a significant improvement over the prior art.

BRIEF SUMMARY OF THE INVENTION

It is an object of the present invention to provide a bus structure for the execution unit of a data processor which facilitates general bidirectional transfers among various functional units and registers while maintaining the number of digital buses to a minimum in order that the execution unit be as dense as possible.

It is a further object of the present invention to provide a bus structure for the execution unit of a data processor which facilitates parallel computations of addresses and data in order to improve the speed and efficiency of the data processor.

Another object of the present invention is to provide a data processor adapted for operating upon 16-bit data words and being adapted to directly address multiple-megabyte memories such that parallel computations of address and data words may be performed.

These and many other objects are accomplished by the present invention which includes first and second digital buses associated with a first storage circuit, a third and a fourth digital bus associated with a second storage circuit, and first and second bidirectional switches for selectively coupling the first and third digital buses to each other and for selectively coupling the second and fourth digital buses to each other. In the preferred embodiment, the first and second storage circuits each include one or more registers for storing address and data information. The first and second digital buses may operate independently of the third and fourth digital buses for allowing parallel operations to occur associated with address and data information stored within the first and second group of registers. The first and second switches allow for the selective concatenation of the first and third digital buses and the second and fourth digital buses to provide for general transfers as well as transfers between the first and second group of registers. In the preferred embodiment, first and second arithmetic units are associated with the first and second group of registers, respectively, for allowing parallel and independent computations.

BRIEF DESCRIPTION OF THE DRAWINGS

FIG. 1 is a simplified block diagram of a data processor which generally includes control circuitry and an execution unit.

FIG. 2 is a block diagram of the execution unit of the data processor and illustrates the segmented bus structure of the present invention.

FIGS. 3A-3C are a more detailed block diagram of the execution unit illustrated in FIG. 2.

DETAILED DESCRIPTION OF THE INVENTION

Figure 3A:
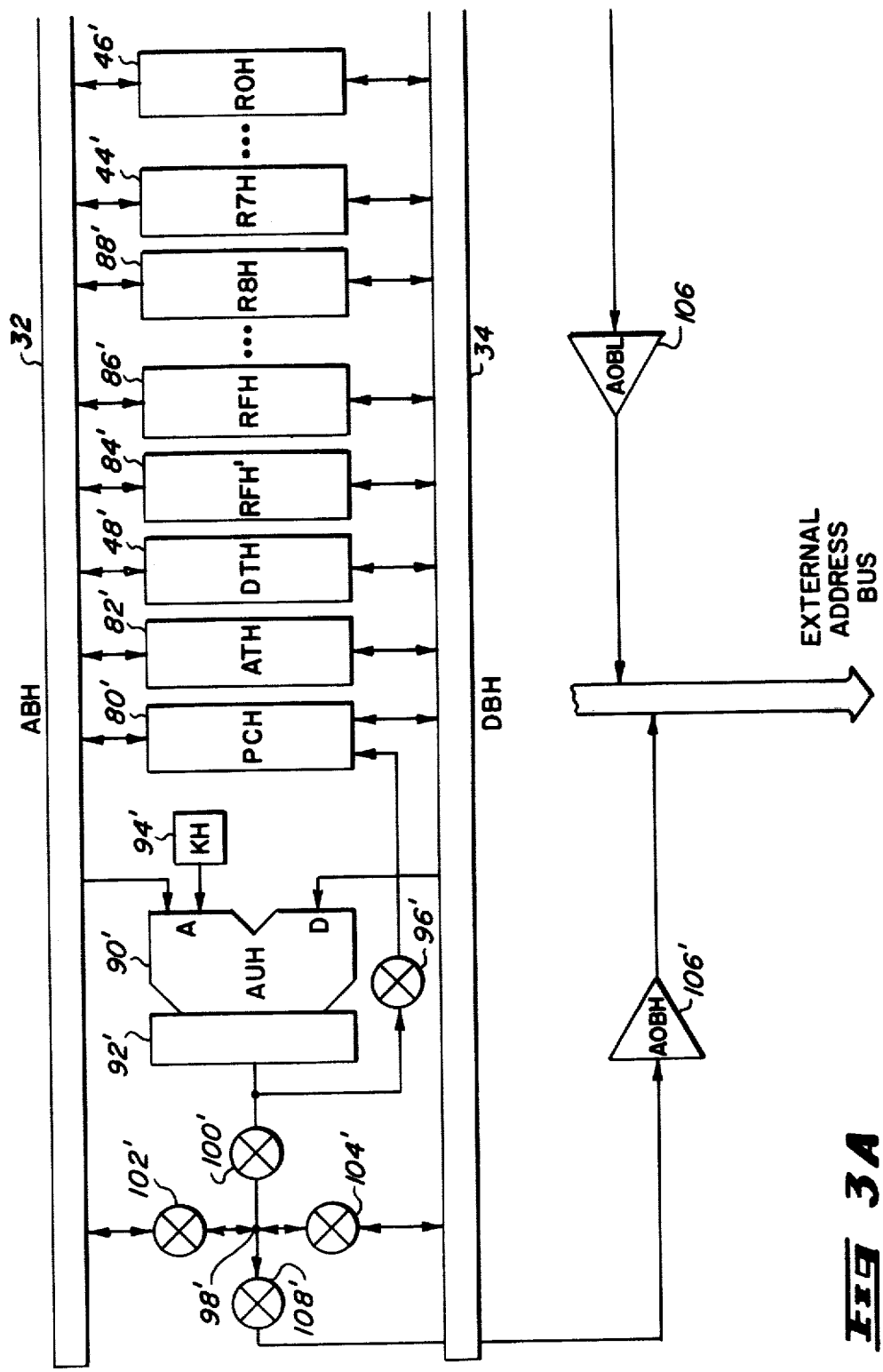

In FIG. 1, a simplified block diagram of a data processor is shown which may be used in conjunction with the present invention. An instruction register 2 stores an instruction which was received from a program memory. The stored instruction is output by instruction register 2 to instruction decode block 4. Instruction decode block 4 derives information from the instruction such as a function to be performed by an arithmetic-logic unit within execution unit block 6 as well as the registers which will provide data to the ALU and registers which will store the result formed by the ALU. Instruction decode block 4 is also coupled to a control store block 8 which provides timing and control signals to execution unit block 6.

The execution of a particular instruction may require several execution unit time periods such that various transfers and functions are performed by execution unit block 6 during each of the execution unit time periods. The timing and control signals provided by control store block 8 ensure that the proper sequence of transfers and operations occurs during each of the execution unit time periods. The operation of instruction decode block 4 and control store block 8 is described in further detail in co-pending application "Microprogrammed Control Apparatus For Data Processor", invented by Tredennick et al, bearing Ser. No. 961,796, and assigned to the assignee of the present invention.

In FIG. 2, a block diagram is shown of the execution unit for the data processor according to a preferred embodiment of the present invention. A first digital bus 10 and a second digital bus 12 have been labeled ADDRESS BUS DATA and DATA BUS DATA, respectively. A group of 16-bit data registers, illustrated by block 14, is coupled to digital buses 10 and 12 such that block 14 can provide a 16-bit data word to either digital bus 10 or digital bus 12. Similarly block 14 may receive from either bus 10 or bus 12 a 16-bit data word which is to be stored in one of the registers. It is to be understood that each of the digital buses 10 and 12 is adapted for transmitting 16 bits of digital information. The 16-bit data registers contained by block 14 comprise the least significant 16 bits of a corresponding plurality of 32-bit data registers.

Blocks 16 and 18 are also coupled to digital buses 10 and 12. Block 16 contains a special function unit which will be later explained in regard to FIG. 3. Block 18 contains an arithmetic and logic unit which receives a first 16-bit input from bus 10 and a second 16-bit input from bus 12 and generates a 16-bit result. The 16-bit result may then be transferred onto either bus 10 or bus 12.

Also shown in FIG. 2 is a third digital bus 20 and a fourth digital bus 22. Bus 20 and bus 22 have been labeled ADDRESS BUS LOW and DATA BUS LOW, respectively. Block 24 is coupled to both bus 20 and bus 22 and contains a plurality of 16-bit address registers. These registers comprise the least significant 16 bits of a corresponding plurality of 32-bit address registers. Block 24 can provide a 16-bit address word to either bus 20 or bus 22. Similarly block 24 can receive a 16-bit address word from either bus 20 or bus 22 for storage in one of the 16-bit address registers.

Block 26 is also coupled to bus 20 and bus 22 and contains an arithmetic unit for performing computations upon the least significant 16 bits of an address word. Block 26 receives a first 16-bit input from bus 20 and a second 16-bit input from bus 22 and generates a 16-bit result. The 16-bit result produced by ARITHMETIC UNIT LOW 26 may be transferred onto bus 20 or onto bus 22. ARITHMETIC UNIT LOW 26 also produces a carry-out signal (not shown) which may be used in computations involving the most significant 16 bits of a 32-bit address word. First and second bidirectional bus switches 28 and 30 are shown coupled between bus 10 and bus 20 and between bus 12 and bus 22, respectively.

Also shown in FIG. 2 is a fifth digital bus 32 and a sixth digital bus 34. Bus 32 and bus 34 have been labeled ADDRESS BUS HIGH AND DATA BUS HIGH, respectively. Block 36 is coupled to both bus 32 and bus 34 and contains a plurality of 16-bit address registers and another plurality of 16-bit data registers. The address registers within block 36 comprise the most significant 16 bits of the 32-bit address registers formed in conjunction with the registers contained by block 24.

The 16-bit data registers within block 36 comprise the most significant 16 bits of a plurality of 32-bit data registers formed in conjunction with the data registers contained by block 14.

Block 38 is also coupled to bus 32 and bus 34 and contains an arithmetic unit for performing computations upon the most significant 16 bits of either address or data words. Block 38 receives a first 16-bit input from bus 32 and a second 16-bit input from bus 34 and generates a 16-bit result. The 16-bit result produced by ARITHMETIC UNIT HIGH 38 may be transferred onto bus 32 or bus 34. As previously mentioned, ARITHMETIC UNIT HIGH 38 can be responsive to a carry out produced by block 26 such that a carry out from the least significant 16 bits is considered a carry in to the most significant 16 bits. Third and fourth bidirectional bus switches 40 and 42 are shown coupled between bus 32 and bus 20 and between bus 34 and bus 22, respectively.

Thus it may be seen that the register file for the data processor is divided into three sections. Two general buses (ADDRESS BUS, DATA BUS) connect all of the words in the register file. The register file sections (HIGH, LOW, DATA) are either isolated or concatenated using the bidirectional bus switches. This permits general register transfer operations across register sections. A limited arithmetic unit is located in the HIGH and LOW sections, and a general capability arithmetic and logical unit is located in the DATA section. This allows address and data calculations to occur simultaneously. For example, it is possible to do a register-to-register word addition concurrently with a program counter increment (the program counter is located adjacent to the address register words, and carry out from the ARITHMETIC UNIT LOW 26 is provided as carry in to ARITHMETIC UNIT HIGH 38). Special functional units for bit manipulation are located in the data section.

Two factors combine to suggest the desirability of the configuration shown in FIG. 2. The first factor is a very dense two-port static RAM (random-access-memory) cell which conveniently supports a two-bus structure. The second factor is the 16-bit data width which makes 16-bit segmentation of the registers desirable.

Figure 3B:
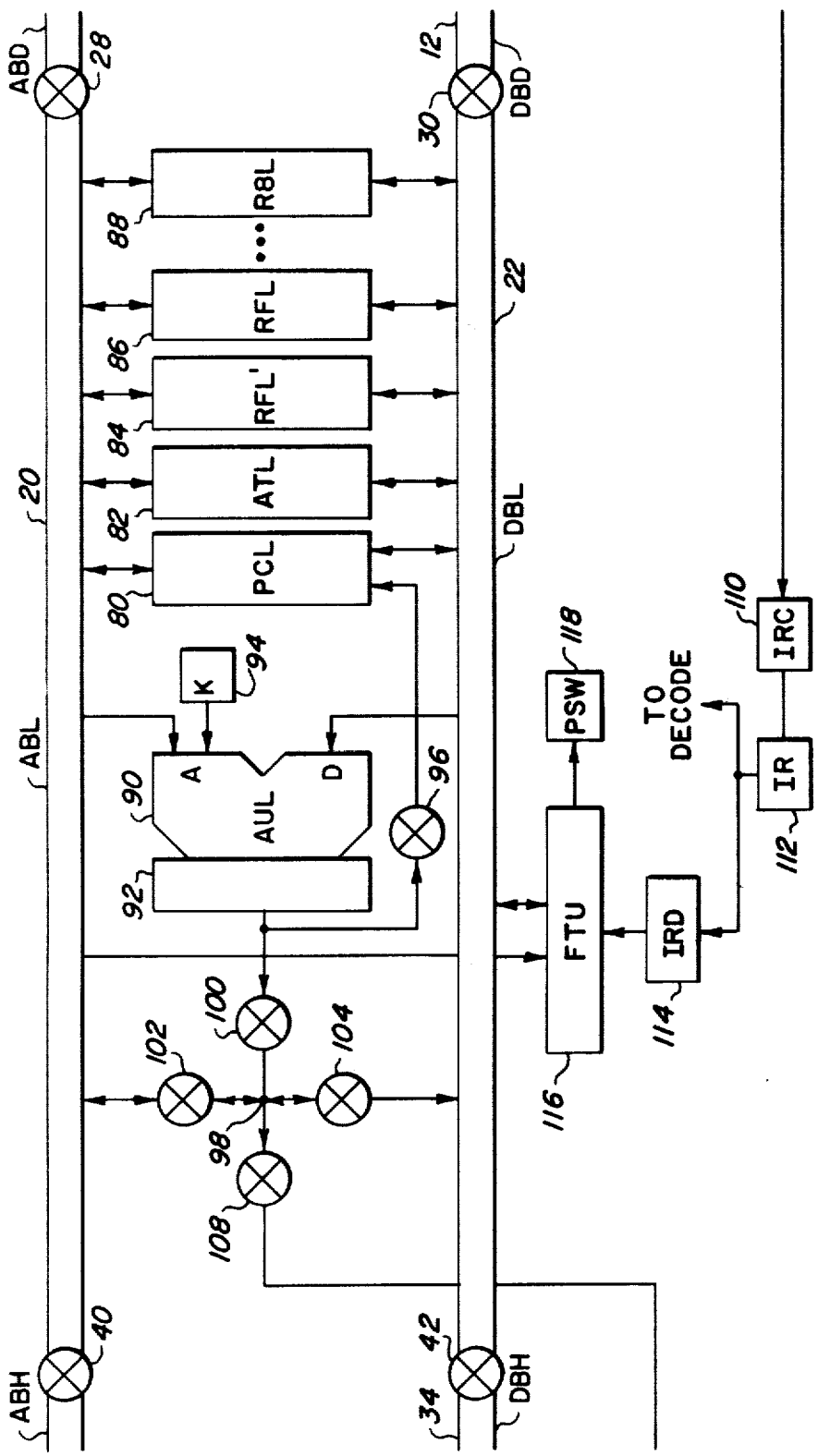

In FIGS. 3A-3C the execution unit illustrated in FIG. 2 is shown in further detail. Also shown in FIGS. 3A-3C is the interconnection of the execution unit to the data processor address output port, which interfaces with an external address bus, and the interconnection of the execution unit to the data processor input/output data port, which interfaces with a bidirectional external data bus. Referring first to the data section of the segmented bus structure, register 44 (R7) through register 46 (R0) represent eight 16-bit registers corresponding to the least significant 16 bits of eight 32-bit data registers. Register 48 (DTL) is a DATA TEMPORARY LOW 16-bit register which is not available to a user but which may be used by the data processor control circuitry for temporarily storing a 16-bit quantity. Arithmetic logic unit 50 (ALU) is capable of performing various arithmetic and logic functions upon two 16-bit input data words for generating a result which can be stored in result latch 52. The inputs to ALU 50 include bus 10 and bus 12. A data constant block 54 may also be selected as an input for supplying various 16-bit constants. Also the output of register 56 (ALUB) may be selected as an input to ALU 50. Register 56 may be written with a 16-bit data word from either bus 10 or bus 12. Register 56 is particularly useful for multiply and divide operations during which the multiplier or divisor can be retained in register 56 such that neither bus 10 nor bus 12 is required to supply the multiplier or divisor during successive additions or substractions.

An ARITHMETIC LOGIC UNIT EXTENSION register 58 (ALUE) is a 16-bit register which can be read from and written by bus 12. ALUE register 58 is coupled to ALU 50 and can operate as a shift register such that serial bit transfers may occur between ALU 50 and register 58. Register 58 may be used in conjunction with ALU 50 to accomplish double word (32-bit) shift operations. The resultant 32-bit shift register may be used to accumulate a double-word product for a multiply operation and for holding a 32-bit dividend during a divide operation.

Block 60 (DCR) is a decoder which is useful for bit manipulation. DCR block 60 receives a 4-bit encoded input from bus 10 and provides a fully decoded 16-bit output to bus 12 such that only one of the 16 output bits is a logic "1". The decoded 16-bit output may be used as a mask on one input of ALU 50 for masking off 15 of the 16 bits provided to the other input of ALU 50.

The output of ALU latch 52 can be transferred to a point labeled 64 by coupler switch 62. Point 64 can be selectively coupled to either bus 10 or bus 12 by coupling switches 66 and 68, respectively. Thus, the ALU latch 52 can drive either bus 10 or bus 12. Point 64 may also be coupled to byte multiplexer 70 by enabling coupling switch 72. Depending upon whether coupling switch 62, 66, or 68 is enabled, the source for the input of byte multiplexer 70 may be ALU latch 52, bus 10, or bus 12, respectively. Byte multiplexer 70 provides a 16-bit output to DATA OUTPUT BUFFER 74 (DOB) which includes a latch for latching the output of multiplexer 70. The output of DOB 74 is coupled to a 16-bit data input/output port of the data processor chip which interfaces with an external 16-bit bidirectional data bus. The external data bus could for example be coupled to memory chips which contain instructions and data upon which the data processor chip will operate.

Data bus input buffer 76 (DBIN) includes a latch for storing a 16-bit data word received from the external data bus. The output of DBIN 76 is coupled to a second byte multiplexer 78. Byte multiplexer 78 can provide a 16-bit data word to either bus 10 or bus 12.

The function of byte multiplexers 70 and 78 will now be described. Although ALU 50 is designed primarily to perform 16-bit arithmetic and logic operations, it is often necessary to perform an operation upon an 8-bit group (byte). Thus, ALU 50 is designed to provide status flags for byte-carry, byte-zero, and byte-overflow for the eight least significant bits of the result generated by ALU 50. If an operation is to be performed upon the high order byte of a 16-bit data word received by input buffer 76, then it is necessary to move the high order byte to the least significant bit positions of ALU 50. Byte multiplexer 78 is adapted to selectively interchange the high and low order bytes of a 16-bit data word. Similarly, byte multiplexer 70 is adapted to selectively interchange the high and low order bytes of the 16-bit data word transmitted by coupling switch 72 so as to reverse the function performed by byte multiplexer 78.

Another feature of the structure thus far described with regard to FIGS. 3A-3C is the ability to select as the source for DOB 74 either a data word on one of the buses (10 or 12) or a data word latched by ALU latch 52. This feature allows the execution unit of the data processor to operate in a more parallel manner and is particularly important for double-word operations. As an example, a register-to-memory add instruction can be considered wherein a 32-bit data word from memory is added to a 32-bit register in the execution unit, and the 32-bit result is returned to memory for storage. In this example, the lower 16 bits of the memory data word can be accessed during a first time period. During a second time period, ALU 50 can perform the addition of the lower 16 bits of the data word and the lower 16 bits of the register while the data processor transmits the address in memory of the high order 16 bits of the data word. ALU latch 52 latches the result generated by ALU 50. During a third time period, the output of latch 52 may be coupled to output buffer 74 for transmitting the lower 16 bits of the result back to memory while bus 10 and bus 12 are free to supply the high order 16-bit operands to ALU 50 to compute the most significant 16 bits of the result.

Also shown in FIGS. 3A-3C are bidirectional bus switches 28, 30, 40 and 42. These bus switches may be comprised of a plurality of MOSFET devices, each having drain, source, and gate terminals. With regard to bus switch 28, two MOSFET devices can be used for each bit of data transmitted by bus 10 and bus 20. As will be later explained, bus 10 and bus 20 each include a true and a complement conductor for each data bit to be transmitted. The drain of a first MOSFET device is coupled to a true conductor for bit zero of bus 20 and the source of this MOSFET device is coupled to the true conductor of bit zero of bus 10. Similarly, a second MOSFET device has its source coupled to the complement conductor for bit zero of bus 20 and its drain coupled to the complement conductor for bit zero of bus 10. MOSFET devices are also included for the other 15 bits of data in a similar fashion. The gate terminals of these MOSFET devices are coupled in common and are connected to control logic which selectively enables or disables the plurality of MOSFET devices. Similarly, bidirectional bus switches 30, 40 and 42 each include a corresponding number of MOSFET devices and each group of MOSFET devices is coupled to control logic such that each bidirectional bus switch may be enabled or disabled independently of the other bidirectional bus switches.

Also shown in FIGS. 3A-3C is an ADDRESS LOW section coupled to buses 20 and 22. Register 80 (PCL) is coupled to bus 20 and bus 22 and comprises the least significant portion of a 32-bit program counter register. Register 82 (ATL) is also coupled to bus 20 and bus 22 and comprises the least significant 16 bits of a 32-bit address temporary register. This register is not available to a user, but may be used by the data processor control logic for temporarily storing address or other information. Register 84 (RFL') is coupled to bus 20 and bus 22 and comprises the least significant portion of a 32-bit hardware stack pointer. The hardware stack pointer is useful for pointing to a section of memory referred to as a stack which is used to store return addresses for subroutine linkages and which may also be used to save the contents of particular registers when an interrupt is recognized by the data processor. Registers 86 (RFL) through 88 (R8L) are coupled to bus 20 and bus 22 and correspond to the least significant portion of eight 32-bit address registers which are available to the user. Typically register 86 may be used as a user stack pointer for pointing to a section of memory where data may be stored for conveniently passing arguments from a main program to a subroutine and back to a main program.

ARITHMETIC UNIT LOW 90 can perform 16-bit arithmetic operations upon two 16-bit input address words. The result generated by AUL 90 can be stored in latch 92. Inputs to AUL 90 include bus 20 and bus 22. Also blocks 94 (KL) may be selected as an input to AUL 90 for providing various 16-bit constants. Block 94 operates in conjunction with a similar block in the HIGH section for providing a 32-bit address constant. The output of latch 92 is connected to switch coupler 96 for selectively writing the output of latch 92 into PCL register 80. The output of latch 90 is also coupled to a point designated 98 by switch coupler 100. Point 98 may also be coupled to bus 20 and bus 22 by switch couplers 102 and 104 respectively. Thus the output of latch 92 may be written onto either bus 20 or bus 22. Point 98 is also coupled to an address output buffer 106 (FIG. 3A) by switch coupler 108 for providing the least significant 16 bits of an address to be transmitted to the external address bus. Switch couplers 100, 102, and 104 may be controlled so as to select the output of latch 92, bus 20, or bus 22 as the source of the input to buffer 106.

Also shown in FIG. 3 is an ADDRESS HIGH section associated with bus 32 and bus 34. Since the operation of this section is very similar to that of the address LOW section already described, the ADDRESS HIGH section will be described only briefly. Register 82' (ATH) contains the most significant 16 bits of the 32-bit register formed in conjunction with register 82. Similarly register 48' (DTH) contains the 16 most significant bits of the 32-bit register formed in conjunction with register 48. Similarly, the other registers in the address HIGH section have been designated by a primed reference numeral so as to indicate a correspondence with the least significant 16-bit registers already described. Similarly other corresponding elements have been designated by primed reference numerals.

Logic circuitry (not shown) associated with bus 32 and bus 34 can provide a sign-extension feature as will now be described. In the event that a 16-bit address word is to be added to a 32-bit address register, then the 16-bit address word and the least significant 16 bits of the address register are added in the ADDRESS LOW section. Since the 16-bit address word may be represented in twos complement form, it is necessary to provide a dummy 16-bit group to the address HIGH section such that all of the bits in the dummy group are all logic "0" or logic "1" as determined by the sign bit or most significant bit of the 16-bit address word. As was previously mentioned, each bus includes a true and a complement conductor for each of the 16-bits to be transmitted. Prior to any transfer, both the true and complement conductors are precharged to a high level or logic "1". Therefore, the logic circuitry provides a sign extension function by merely discharging to a low level or logic "0" either the true or complement conductor in a HIGH section bus as determined by the status of the most significant bit on the corresponding LOW section bus. The discharge circuitry includes a plurality of MOSFET devices coupled between each bus conductor and ground potential for selectively coupling a bus conductor to ground.

Also shown in FIG. 3 is an instruction register capture block 110 (IRC) which can receive a 16-bit instruction transmitted from the external memory via the external data bus. The output of the instruction register capture block 110 is coupled to an instruction register 112 (IR) for storing the 16-bit instruction. The output of instruction register 112 is coupled to an instruction register delay block 114 (IRD) which can store a copy of an instruction currently being executed even after the next instruction to be executed is entered into instruction register 112. This allows the output of instruction register 112 to be coupled to decode circuitry to prepare for the execution of the next instruction while a present instruction is currently being executed. Particular instruction words contain bit fields which specify the registers to be accessed during the execution of the instruction. These bit fields are preserved in IRD register 114 so as to provide isolation between the decoding of the next instruction and the bit fields needed to execute the current instruction.

The output of IRD register 114 is coupled to a field translate unit block 116 (FTU). FTU 116 is coupled to bus 20 and bus 22 in the ADDRESS LOW section and is also coupled to a processor status word block 118 (PSW). PSW 118 is useful for retaining condition codes which indicate the status of the data processor such as zero detection, overflow detection, carry detection, positive or negative results and various other conditions upon which later instructions, such as branches and jumps, may depend. FTU 116 can be selected to extract a bit field in the instruction contained by register 114; the extracted bit field can then be shifted or translated such that it is in the proper form to be added to an address register for computing a new address. FTU 116 can control sign extension logic such that the extracted bit field is effectively translated into a 16-bit operand. This 16-bit quantity can be extended to a 32-bit operand by means of sign-extension logic previously described.

FTU 116 is also designed to allow for multiple loading and multiple storing of registers. A multiple load refers to the ability of the data processor to transmit the contents of two or more registers to memory for storage in successive memory locations given a single memory instruction. A bit field in a second instruction word stored by DBIN 76 determines which of the possible registers are to be involved in the multiple load or store. FTU 116 decodes this bit field and enables only those registers which are to be involved in the transfer. Other inputs to FTU 116 include constants for multiply and divide operations and trap vectors.

Figure 4:
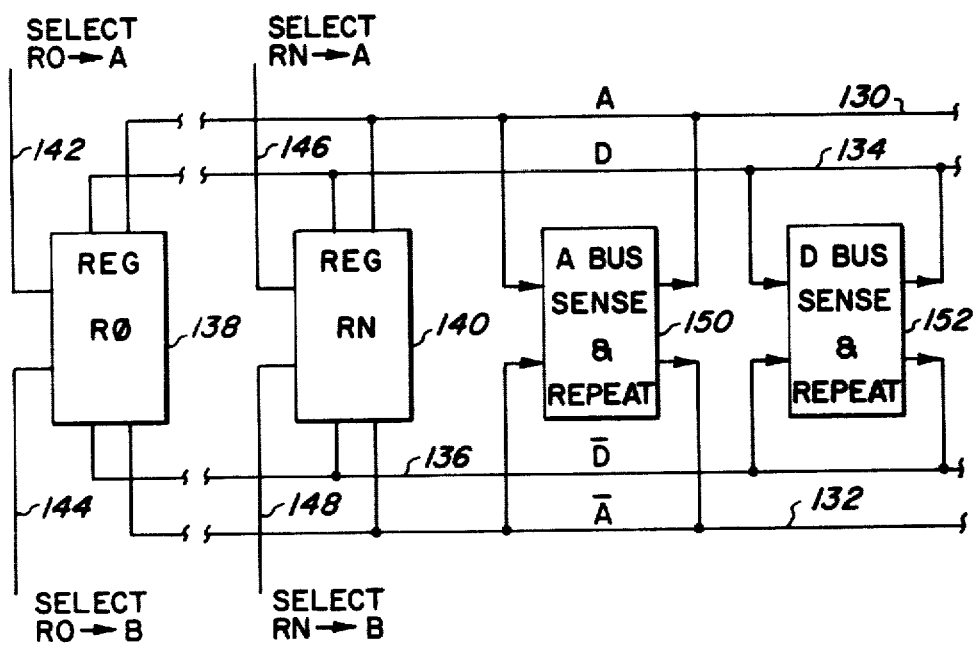
FIG. 4 is a block diagram which includes one group of registers, first and second digital buses, and amplifier circuitry associated with the first and second digital buses.

In FIG. 4 a block diagram is shown which illustrates the operation of a digital bus and its associated registers. An address bus includes a first conductor 130(A) and a second conductor 132(A) for transmitting a single bit of information. It will be realized that the bus includes fifteen other conductors similar to 130 and fifteen other conductors similar to 132 for transmitting the other fifteen bits of information in a 16-bit digital word. Similarly a data bus includes a third conductor 134(D) and a fourth conductor 136(D) for transmitting one bit of information. Dual port registers 138 (R0) thorugh 140 (RN) each have one port coupled to conductors 130 and 132 and a second port coupled to conductors 134 and 136. Register 138 is also coupled to a first control conductor 142 for enabling register 138 onto conductors 130 and 132. A second control line 144 is also coupled to register 138 for enabling register 138 onto conductors 134 and 136. Similarly, control lines 146 and 148 control the interaction of register 140 with conductor pairs 130, 132 and 134, 136, respectively.

Associated with conductors 130 and 132 is a first sense and repeat amplifier 150 which differentially receives a signal conducted by conductors 130 and 132. Sense and repeat amplifier 150 is effective to amplify a small differential signal which initially appears across conductors 130 and 132 for establishing valid logic "1" and logic "0" levels on these conductors. Prior to performing any data transfers, both conductors 130 and 132 are precharged to a HIGH level or logic "1". If the contents of register 138 are to be written onto the address bus, then control line 142 is allowed to go to a high level which actively couples register 138 to conductors 130 and 132. In order to save chip area, the storage circuitry within each of the registers is comprised of MOSFET devices which have small geometries and which have difficulty driving a capacitive load. Thus, upon actively coupling register 138 to conductors 130 and 132, only a small differential signal is created across these conductors. Shortly after the small differential signal is created, sense and repeat amplifier 150 is activated for regeneratively amplifying the small differential signal on conductors 130 and 132. The levels on conductors 130 and 132 are now capable of being recognized by other circuitry as logic "1" or logic "0" levels. The operation of sense and repeat amplifier 152 associated with conductors 134 and 136 is identical to the operation of sense and repeat amplifier 150.

Figure 5:
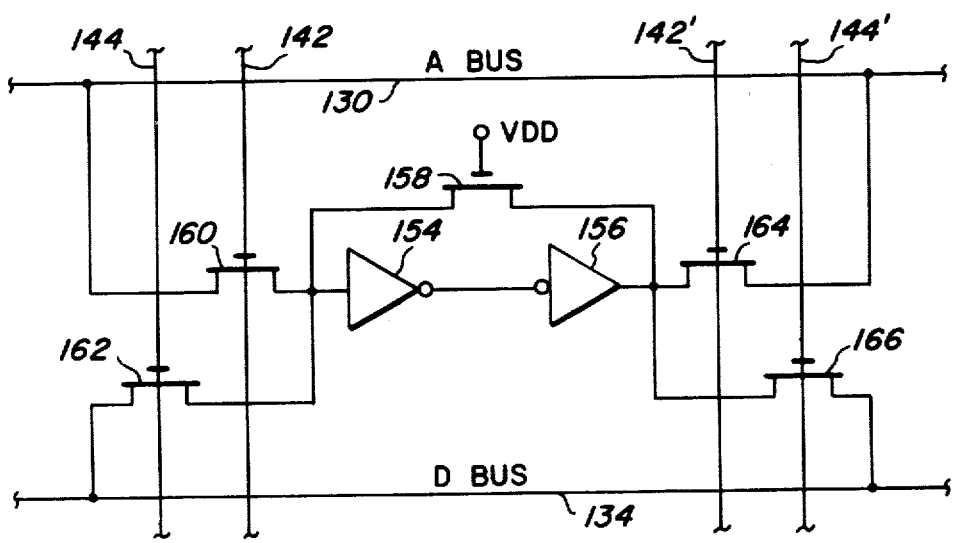
FIG. 5 is a prior art circuit schematic of a register storage cell and associated input/output coupling circuitry.

In FIG. 5, a circuit schematic is shown of a prior art register cell. Conductors which correspond to those shown in FIG. 4 have been identified with the same reference numeral. A first inverter 154 has an output coupled to the input of a second inverter 156. The output of the second inverter 156 is coupled to the input of the first inverter 154 by coupling MOSFET 158 which has its gate terminal coupled to the positive supply voltage VDD. The feedback provided by MOSFET 158 allows the circuit to latch a logic "1" or a logic "0". MOSFET 160 is coupled between conductor 130 and the input of inverter 154, and the gate terminal of MOSFET 160 is coupled to control line 142. When control line 142 is at a high level, MOSFET 160 is conductive and allows data to be written from conductor 130 to the register cell. Similarly MOSFET 162 is coupled between conductor 134 and the input of inverter 154, and control line 144 selectively enables MOSFET 162 in order to write data from conductor 134 to the register cell.

MOSFET 164 is coupled between the output of inverter 156 and conductor 130, and the gate terminal of MOSFET 164 is coupled to control line 142'. When control line 142' is at a high level, the register cell can write data onto conductor 130. Similarly MOSFET 166 is coupled between the output of inverter 156 and conductor 134. Control line 144' selectively enables MOSFET 166 in order to write data from the register cell to conductor 134. It will be noted that in this prior art implementation, four control lines (142, 144, 142', and 144') are required in order to control each register.

Figure 6:
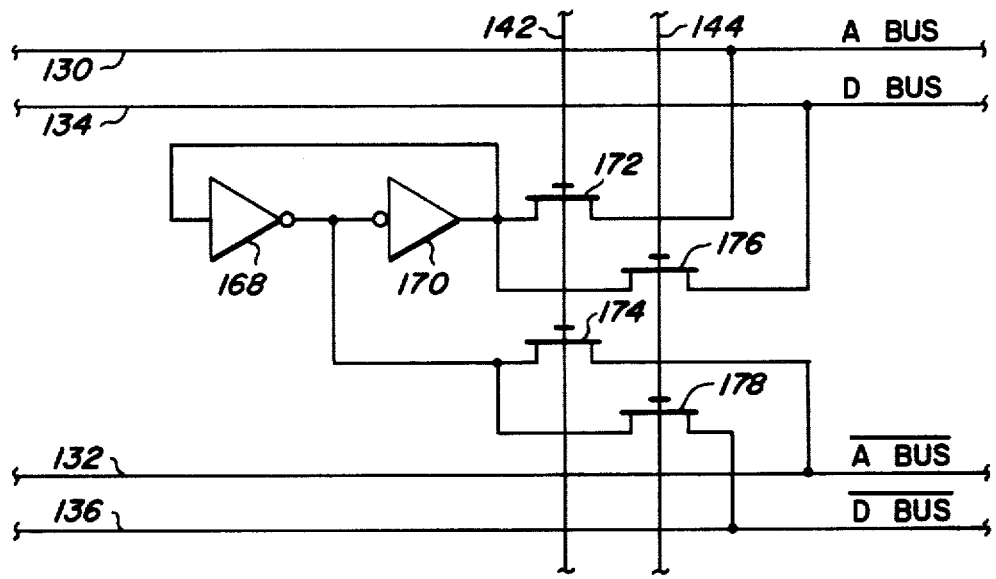
FIG. 6 is a circuit schematic of a dual port register cell and associated input/output circuitry adapted for use within the preferred embodiment of the present invention.

In FIG. 6, a circuit schematic is shown of the register cell used for the preferred embodiment of the invention as described in FIG. 4. The conductors in FIG. 6 which correspond to those already described in FIG. 4 have been labeled accordingly. Inverters 168 and 170 are cross coupled without the need of a feedback MOSFET device as was used in the prior art circuit shown in FIG. 5. MOSFET 172 is coupled between the output of inverter 170 and conductor 130. Similarly MOSFET 174 is coupled between the output of inverter 168 and conductor 132. The gate terminals of MOSFETs 172 and 174 are both coupled to control line 142. When control line 142 is at a high level, MOSFETs 172 and 174 are each conductive and the register cell is actively coupled to the address bus. Similarly, MOSFET 176 is coupled between the output of inverter 170 and conductor 134, and MOSFET 178 is coupled between the output of inverter 168 and conductor 136. The gate terminals of MOSFETs 176 and 178 are each coupled to control line 144. When control line 144 is at a high level, MOSFETs 176 and 178 are conductive, and the register cell is actively coupled to the data bus.

Figure 7:
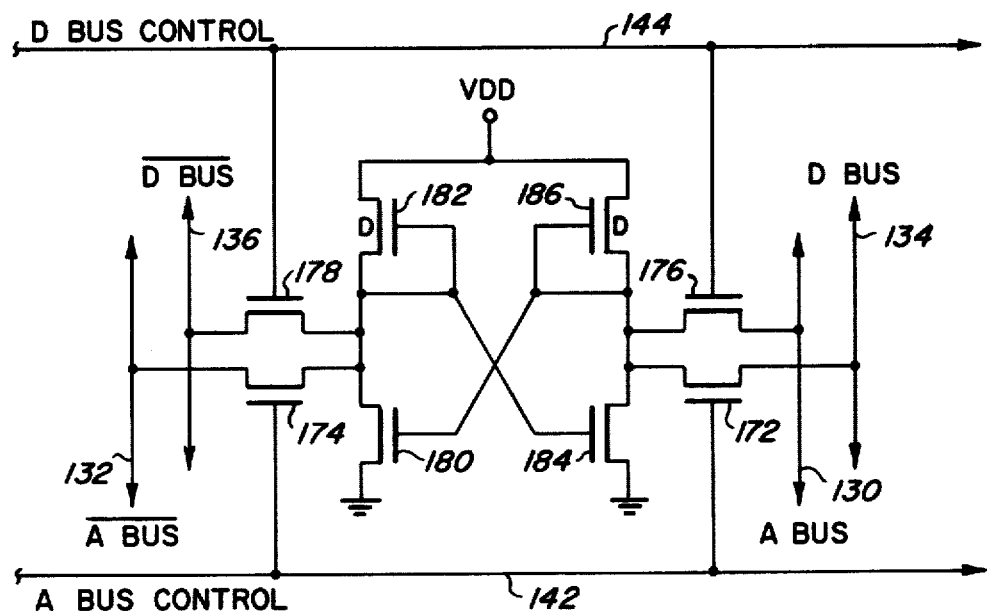
FIG. 7 is a more detailed circuit schematic of the dual port register cell illustrated in FIG. 6.

In FIG. 7, a more detailed circuit schematic is shown of the register cell illustrated in FIG. 6. Corresponding elements in FIG. 7 have been labeled with the identical reference numerals used in FIG. 6. MOSFET devices 180 and 182 form the second inverter 168, while MOSFET devices 184 and 186 form the second inverter 170. MOSFET devices 182 and 186 are depletion mode MOSFET devices and serve as loads for enhancement mode MOSFETs 180 and 184, respectivey. The source terminals of MOSFETs 180 and 184 are each coupled to ground potential, while the drain terminals of MOSFETs 182 and 186 are each coupled to the positive supply terminal VDD. The drain of MOSFET 180 is coupled to the gate and source of MOSFET 182 and provides the output of the first inverter. Similarly, the drain of MOSFET 184 is coupled to the gate and source of MOSFET 186 and provides the output of the second inverter. The gate terminals of MOSFETs 180 and 184 correspond to the inputs of the first and second inverters, respectively.

If it is assumed that MOSFET 180 is conductive while MOSFET 184 is nonconductive, then the drain of MOSFET 180 will be pulled to a low level while the drain of MOFET 184 will be pulled up towards the VDD voltage by MOSFET 186. If it is desired to write the contents of the register cell onto conductors 130 and 132, then control line 142 is driven to a high level for enabling MOSFET devices 172 and 174. It will be remembered that conductors 130 and 132 have previously been charged to a high level. Still assuming that MOSFET 180 is conductive while MOSFET 184 is nonconductive, MOSFET 180 will attempt to discharge conductor 132 through MOSFET 174. On the other hand, MOSFET 184 is nonconductive and MOSFET 186 reinforces the HIGH level precharged on conductor 130. Thus a small differential output signal is created across conductor 130 and conductor 132, and this differential signal may be amplified by a sense and repeat amplifier.

If it is desired to write data into the register cell from the address bus, then high (VDD) and low (ground) levels are established on conductors 130 and 132 after the precharge period and before MOSFETs 172 and 174 are enabled. Once the levels are established on conductors 130 and 132, corresponding to the data to be written, the MOSFETs 172 and 174 are enabled, and the register cell switches to the logic state dictated by the levels on the address bus. The register cell may also be written from the data bus in a similar manner.

Figure 8:
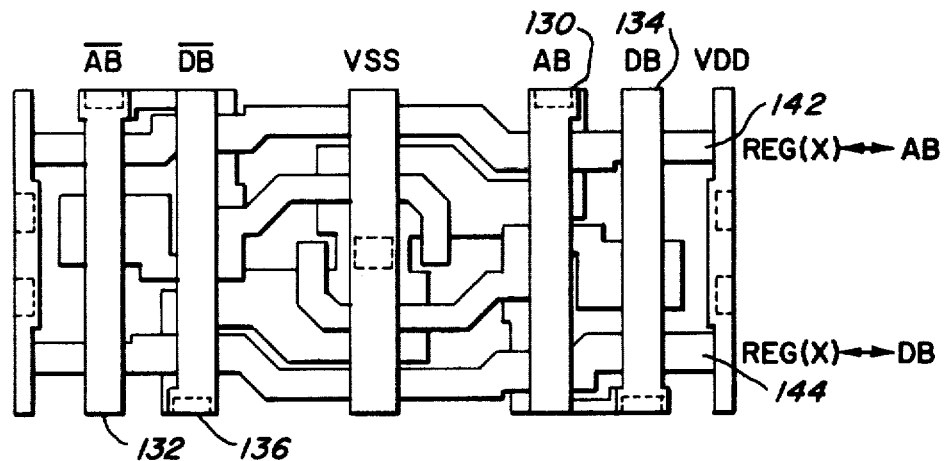
FIG. 8 is a layout drawing illustrating the high density of the register cell shown in FIG. 7 when implemented within an integrated circuit data processor.

FIG. 8 is a layout drawing showing how the circuit of FIG. 7 may be oriented for integrated circuit implementation. Metal runs for bus conductors 130, 132, 134, and 136 are indicated in the drawing as being on the upper surface of the chip. Also shown are metal runs for power supply lines VDD and VSS (ground). Beneath the metal runs and isolated therefrom are channels of polysilicon material running perpendicular to the metal runs. The polysilicon channels conduct the register selection signals and also serve to interconnect the MOSFET devices which form the register cell. The metal runs for VSS, AB, and DB have been spaced apart in order to provide adequate room for adding other metal runs above the register cell for interconnecting other portions of the data processor. The layout area required to implement this register cell is less than half the area required to implement the prior art register cell described with reference to FIG. 5.

Figure 9:
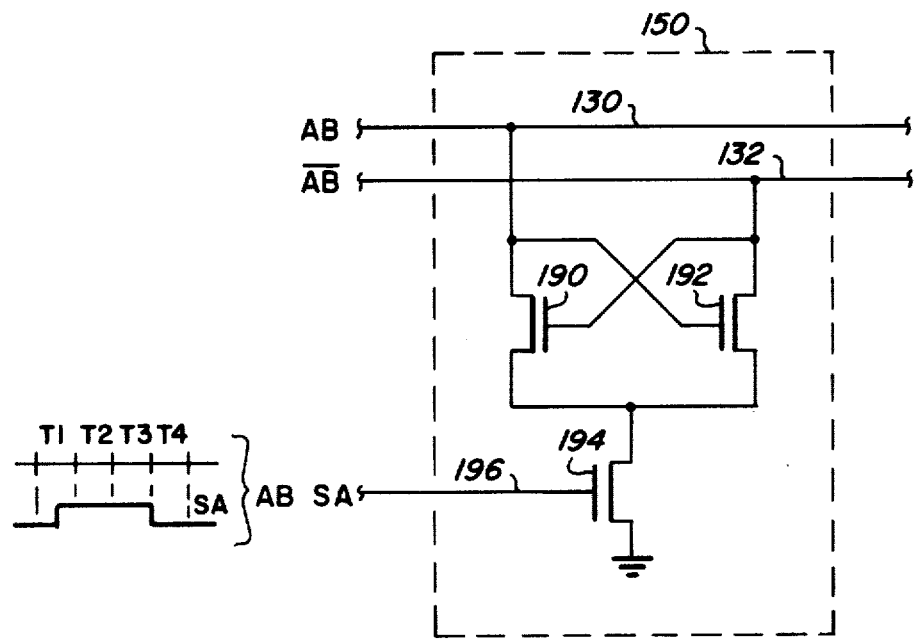
FIG. 9 is a circuit schematic of the bus amplifier blocks shown in FIG. 4.

In FIG. 9, the A bus sense and repeat amplifier 150 shown in FIG. 4 is illustrated in circuit schematic form. MOSFET 190 and MOSFET 192 are cross coupled with each other such that the drain of MOSFET 190 and the gate terminal of MOSFET 192 are coupled to conductor 130. The drain terminal of MOSFET 192 and the gate terminal of MOSFET 190 are each coupled to conductor 132. The source terminals of MOSFET 190 and 192 are each coupled to the drain terminal of MOSFET 194 which has its source terminal coupled to ground potential. The gate terminal of MOSFET 194 is coupled to a sence amp control line 196. As shown in the timing figure adjacent to the circuit schematic, each transfer of information on the bus may be divided into four time periods T1 through T4. During period T4, conductors 130 and 132 are precharged to a high level. At the beginning of time period T1, one of the register cells can be actively coupled to conductors 130 and 132 to create a small differential signal across these conductors. Midway through time period T1, control line 196 is allowed to go to a high level which enables MOSFET 194 which then acts as a current source for cross coupled MOSFETs 190 and 192. The regenerative amplification action of the cross coupled circuit then causes the conductor which is most negative to be pulled all the way down to ground potential for establishing a valid logic "0" level on that conductor. It will be noted that the valid logic "1" and logic "0" levels now established on conductors 130 and 132 will restore the register cell which was accessed during time period T1 in a read-restore fashion. If the data read from a first register cell is to be written into a second register cell, then during time period T2, the second register cell may be actively coupled to the same bus such that the levels established by the sense and repeat amplifier force the logic state of the second register cell to switch to the same logic state as the first register cell.

While the invention has been described with reference to a preferred embodiment, the description is for illustrative purposes only and is not to be construed as limiting the scope of the invention. Various modifications and changes may occur to those skilled in the art without departing from the true spirit and scope of the invention as defined in the appended claims.

What is claimed is:

1. A data processor comprising:
   (a) first storage means for storing digital information of a predetermined bit length;
   (b) first and second bus means coupled to said first storage means for carrying digital information, each of said first and second bus means being adapted to carry digital information of the predetermined bit length;
   (c) second storage means for storing digital information of the predetermined bit length;
   (d) third and fourth bus means coupled to said second storage means for carrying digital information, each of said third and fourth bus means being adapted to carry digital information of the predetermined bit length; and (e) first and second switch means, said first switch means being coupled between said first and third bus means and being responsive to a first control signal for enabling transmission of digital information between said first and third bus means, and said second switch means being coupled between said second and fourth bus means and being responsive to a second control signal for enabling transmission of digital information between said second and fourth bus means, wherein each of said first, second, third and fourth bus means comprise pairs of differential signal conductors, each pair of differential signal conductors being adapted for carrying a true signal and a complement signal for each bit of the predetermined bit length.

2. A data processor as recited in claim 1 further comprising:
   (a) third storage means for storing digital information of the predetermined bit length;
   (b) fifth and sixth bus means coupled to said third storage means for transmitting digital information, each of said fifth and sixth bus means being adapted to carry digital information of the predetermined bit length; and
   (c) third and fourth switch means, said third switch means being coupled between said third and fifth bus means and being responsive to a third control signal for enabling transmission of digital information between said third and fifth bus means, and said fourth switch means being coupled between said fourth and sixth bus means and being responsive to a fourth control signal for enabling transmission of digital information between said fourth and sixth bus means.

3. A data processor as recited in claim 1 further comprising:
   (a) first arithmetic means coupled to said first bus means for receiving from said first bus means first digital information of the predetermined bit length and coupled to said second bus means for receiving from said second bus means second digital information of the predetermined bit length, said first arithmetic means adapted to perform an arithmetic operation upon first and second digital information and to generate first resultant digital information of the predetermined bit length.

4. A data processor as recited in claim 3 further comprising:
   (a) second arithmetic means coupled to said third bus means for receiving third digital information of the predetermined bit length and coupled to said fourth bus means for receiving fourth digital information of the predetermined bit length, said second arithmetic means adapted to perform an arithmetic operation upon third and fourth digital information and to generate second resultant digital information of the predetermined bit length.

5. A data processor as recited in claim 3 further comprising:
   (a) output bus means for carrying digital information, said output bus means including input terminals for receiving input digital information from an external source and latch means coupled to said input terminals for storing the received input digital information; and
   (b) coupling means having an output coupled to said input terminals and having an input coupled to said first arithmetic means and to at least one of said first and second bus means, said coupling means being responsive to selection signals for selecting either said first resultant digital information or digital information transmitted by said at least one bus means as the input digital information for said output bus means.

6. A data processor as set forth in claim 1, further comprising:
   (a) means for receiving a signal from a true and complement pair of conductors of the bus means,
   (b) means connected to the true and complement conductors and to the means for receiving, for amplifying the received signal and repeating the amplified signal onto the pair of conductors.

* * * * *